United States Patent [19]
Yamaguchi et al.

[11] 3,857,816
[45] Dec. 31, 1974

[54] METHOD OF MANUFACTURING POLYMER GRAFT-POLYMERIZED ONTO CRYSTALLINE INORGANIC SALT

[76] Inventors: Tadashi Yamaguchi, No. 9-29, Hachiman 3-chome, Sendai-shi, Miyagi-ken; Hiroshi Hoshi, No. 426, Saginuma-cho 1-chome, Narashino-shi, Chiba-ken; Michio Hirakawa, No. 22-9, Mama 5-chome, Ichikawa-shi, Chiba-ken; Isao Watanabe, No. 1724, Yatsu 8-chome, Narashino-shi, Chiba-ken, all of Japan

[22] Filed: Aug. 2, 1972

[21] Appl. No.: 277,343

[30] Foreign Application Priority Data
Aug. 3, 1971   Japan.............................. 46-57949

[52] U.S. Cl......... 260/63 R, 260/63 N, 260/63 HA, 260/80 M, 260/80 C, 260/80.3 R, 260/80.7, 260/80.8, 260/82.1, 260/83.5, 260/83.7, 260/84.1, 260/85.7, 260/87.5 R, 260/87.7, 260/88.2 C, 260/92.8 W, 260/93.1, 260/93.5 W, 260/94.3, 260/95, 260/89.5 A

[51] Int. Cl....... C08f 3/00, C08f 15/04, C08f 15/08

[58] Field of Search........ 260/89.5 A, 63 N, 63 HA, 260/63 R, 80 M, 806, 80.3 R, 80.7, 80.8, 82.1, 83.5, 83.7, 84.1, 85.7, 87.5 R, 87.7, 88.2 C, 92.8, 93.1, 93.5, 94.3, 95

[56] References Cited
UNITED STATES PATENTS

| 2,097,263 | 10/1937 | Strain..................................... 260/2 |
| 3,208,984 | 9/1965 | Dekking............................. 260/89.5 |
| 3,704,264 | 11/1972 | Gorman............................. 252/316 |

*Primary Examiner*—Lester L. Lee
*Attorney, Agent, or Firm*—Woodhams, Blanchard and Flynn

[57] ABSTRACT

A polymer graft-polymerized onto a crystalline inorganic salt can be produced by the process of introducing, into a suspension of a crystalline inorganic salt, a compound capable of supplying the same anions as those of said inorganic salt or anions which are capable of effecting double decomposition of said inorganic salt, in the presence of at least one monomer capable of radical polymerization or radical copolymerization.

9 Claims, 4 Drawing Figures

FIG. I

METHOD OF MANUFACTURING POLYMER GRAFT-POLYMERIZED ONTO CRYSTALLINE INORGANIC SALT

BACKGROUND OF THE INVENTION a. Field of the Invention

The present invention relates to a method of manufacturing a polymer graft-polymerized onto a crystalline inorganic salt, which comprises the steps of forming active sites on the surface of said crystalline inorganic salt and polymerizing polymerizable monomers onto said active sites.

The special polymer obtained by the method of the present invention is a polymer in the state of so-called graft-polymerization onto a crystalline substance. As to the term "the state of so-called graft-polymerization" herein, it is yet to be clarified whether it is an exact graft-polymerization in the strict sense of the word. However, it is clear, in view of the showings in the examples to be given later on, that the relation between the crystalline substance and the polymer is obviously not a mere absorption or adhesion, and therefore, it will be termed 'graft-polymerization' hereunder for convenience's sake.

b. Description of the Prior Art

It has been reported that organic polymers may be bonded to inorganic compounds (cf.V.A.Kargin et al. Vysokomo 1, Soedin 1, 330~331, 1713~20 (1959)), (A. Blumstein J.P.S. A3 2653 (1965), J. A. Bittles et al. J.P.S. A2 1221 (1964). However, heretofore, no effective product or commercially acceptable process has been suggested to provide this result.

SUMMARY OF THE INVENTION

The principal object of the present invention is to provide a method of manufacturing a polymer as graft-polymerized onto a crystalline inorganic salt, which is characterized by the steps of introducing a compound capable of supplying the same anions as those of said inorganic salt, or anions which are capable of effecting double decomposition of said inorganic salt, into a suspension of said crystalline inorganic salt in the presence of monomer(s) capable of undergoing radical polymerization or radical copolymerization, which monomer(s) are hereinafter referred to as polymerizable monomer.

Another object of the present invention is to provide a graft polymer having a nucleus consisting of a crystalline inorganic salt, which is possessed of superior moldability, satisfactory compatibility as well as filling ability with respect to resins which are the same as, or different from, the resin of which said graft polymer consists.

A further object of the present invention is to provide a graft polymer having a nucleus consisting of a crystalline inorganic salt, which is possessed of a superior strength by virtue of graft-bonding.

Introduction of a compound capable of supplying anions, as set forth above, into the suspension of a crystalline inorganic salt changes at least a part of the surface of said inorganic salt into a new crystalline inorganic salt. It has been found that this newly produced crystalline inorganic salt is active and a polymerizable monomer readily polymerizes onto the active site of this inorganic salt to thereby produce a graft polymer with its nucleus consisting of said newly produced crystalline inorganic salt.

In the present invention, all monomers having independent radical polymerizability and radical copolymerizability are applicable. In other words, any monomer can be employed so long as the $e$-value thereof, as defined by Alfrey-Price, is in the range of from $-0.8$ to $+0.8$. A mixture of monomers selected from such monomers may be made into a copolymer. To give examples of such monomers, there are exemplified styrene, vinyl isocyanate, 1-pentene, vinyl stearate, 2-vinylpyridine, m-chlorostyrene, n-octyl methacrylate, vinyl acetate, sodium acrylate, chloroprene, vinyl laurate, vinyl chloride, vinylidene chloride, methyl methacrylate, pentachlorostyrene, methyl acrylate, methyl vinyl ketone and acrylic acid. In addition, any monomer is applicable so long as the e-value as defined by L. J. Young, Journal of Polymer Science, 54,411 (1961) is in the range of from $-0.8$ to $+0.8$. Even monomers having an $e$-value of less than $-0.8$ or more than $+0.8$ are also applicable, provided that they are employed for copolymerization with monomers having an $e$-value of from $-0.8$ to $+0.8$, as is generally known. Suitable monomers may be easily selected by any one skilled in this art.

It is to be noted that the inorganic salt and the compound capable of supplying anions to act thereon for use in the present invention cannot be specified by concrete chemical designation. In the method of the present invention there is chosen an appropriate combination of the inorganic salt capable of forming active sites on its surface and the compound capable of supplying anions in order to meet the requirement that active sites must be produced on the surface of the inorganic salt in the presence of the monomer(s). Examples will be given hereunder of how to produce active sites on the surface of a crystalline inorganic salt by virtue of such combination:

1. The process of producing active sites on the surface of the crystals of calcium sulfite by introducing $SO_2$ gas into a suspension of crystalline calcium sulfite to thereby produce acid calcium sulfite on at least a part of said crystals.

2. The process of producing active sites on the surface of the crystals of calcium carbonate by introducing $CO_2$ gas into a suspension of crystalline calcium carbonate to thereby produce calcium bicarbonate on at least a part of the surface of said crystals.

3. The process of producing active sites on the surface of the crystals of calcium carbonate by introducing $SO_2$ gas into a suspension of crystalline calcium carbonate to thereby produce acid calcium sulfite on at least a part of the surface of said crystals.

In this connection, the conditions of introduction of the compound to supply anions, in the present invention, varies with the kind of the monomer, crystalline inorganic salt, solvent, etc.: but it is usual to introduce said compound at a temperature in the range of 10°~60°C under atmospheric pressure. Besides, the foregoing gases may be employed in the liquid phase such as in aqueous solution.

Further, in practicing the method of the present invention, the respective quantity of the monomer, crystalline inorganic salt and anion-supplying compound can be optionally determined in accordance with known chemical techniques by taking into consideration the intended use of the polymer of the present invention as well as the operational conditions. In the method of the present invention, the monomer is used either as it is or by making it into a solution or an emulsion by employing a conventional solvent for use in solution-polymerization or emulsion-polymerization, e.g., water, aromatic hydrocarbons such as benzene and the like, alcohols, ketones, alkyl halogenides, ether, surface active agent, particularly, nonionic surface active agent, etc. On this occasion, the concentration of the monomer in said solution or emulsion is appropriately chosen in consideration of the kind of the monomer and the means of producing active sites on the crystalline inorganic salt.

The ratio of the polymer portion to the total weight of the product to be obtained by the method of the present invention can be easily modified at will by regulating the relative quantities of the starting materials to be employed.

A product according to the present invention wherein the weight ratio of the polymer portion to the total weight of the product is relatively high, such as more than about 10 wt percent, particularly, more than 50 wt percent, can be used not only as a material to be molded as it is, but also as a filler for putty, etc. A product according to the present invention wherein said ratio is relatively low, such as less than several wt percent, cannot be molded as it is, but, when it is employed as a filler for other synthetic resins, particularly those resins which are of the same kind as that constituting said polymer portion, its compatibility with the resin is improved, so that it demonstrates an excellent effect so that the filling is performed very easily.

Further, the product according to the present invention can be used as follows:

The present product, when dried, has a powdery appearance, and this powdery product can be molded into optional shapes by heating. By bringing this product—either intact or after molding—into contact with an acid solution comprising hydrochloric acid, nitric acid or acetic acid to thereby leach out the inorganic salt constituting the nucleus of said polymer, a very fine, hollow polymer or a porous substance can be obtained. The thus obtained hollow polymer can be made into a porous substance of optional shape by subjecting it to heat molding. The porous substance obtained as above can be used as, for instance, filtering material, etc.

Hereunder will be given concrete examples embodying the present invention.

DESCRIPTION OF THE PREFERRED EMBODIMENTS

EXAMPLE 1.

Figure 1:
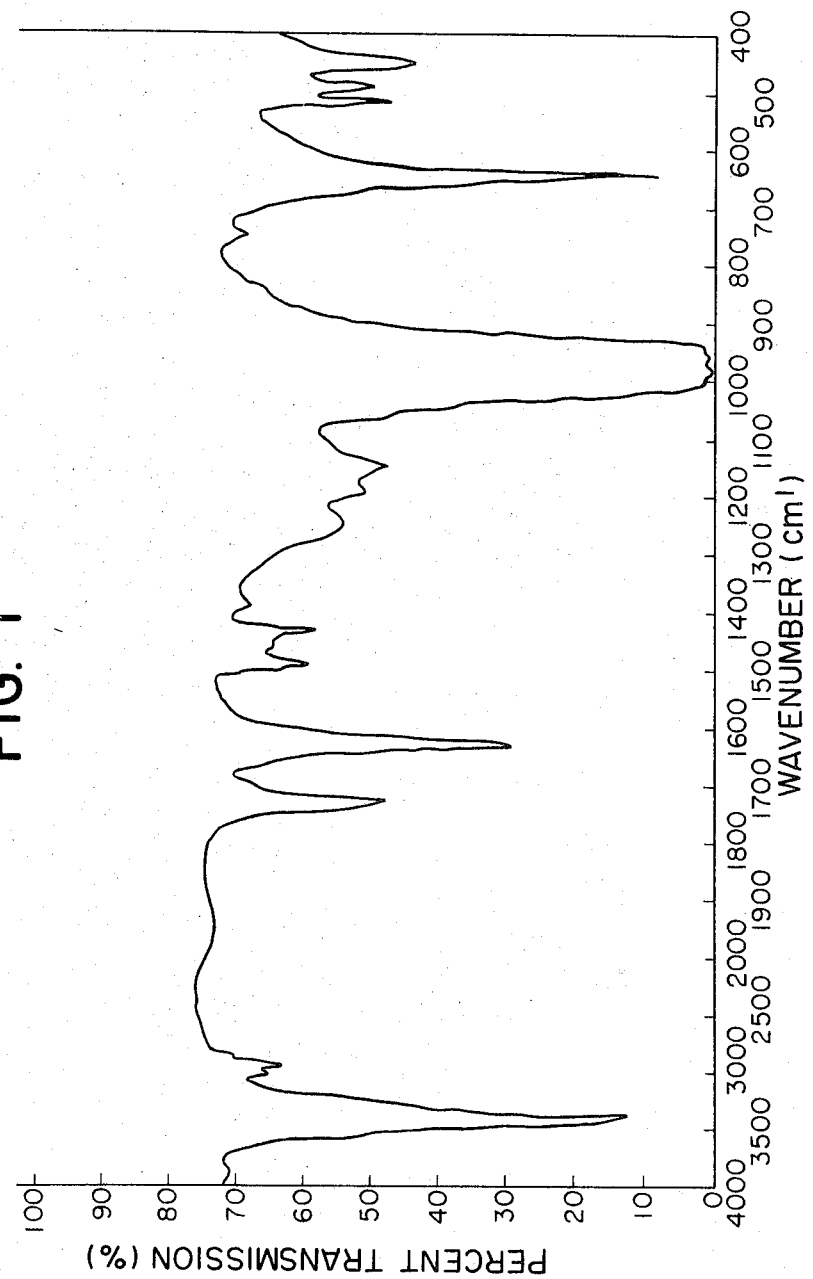
FIG. 1 and FIG. 3 show the infared spectra of the respective graft polymers obtained in Example 1 and Example 2.

After suspending 500 g of calcium sulfite having a grain size of less than 100 mesh in 1,875 g of water at 50°C under atomspheric pressure, 125 g of methyl methacrylate monomer was added to the suspension. Next, 27.3 g of sulfur dioxide was blown into this suspension with stirring over a 1 hour period at said temperature. After completion of the blowing, by filtering the suspension and then drying the residue, 596 g of solid matter was obtained. By this process, water-soluble calcium hydrogen sulfite was produced on a part of the calcium sulfite and the content of calcium sulfite in the residue decreased. When a portion of the resulting solid matter was analyzed by means of infrared absorption spectrum, the result showed that the solid matter was composed of calcium sulfite and mainly of polymethyl methacrylate (cf. FIG. 1 of the appended drawings).

Figure 2:
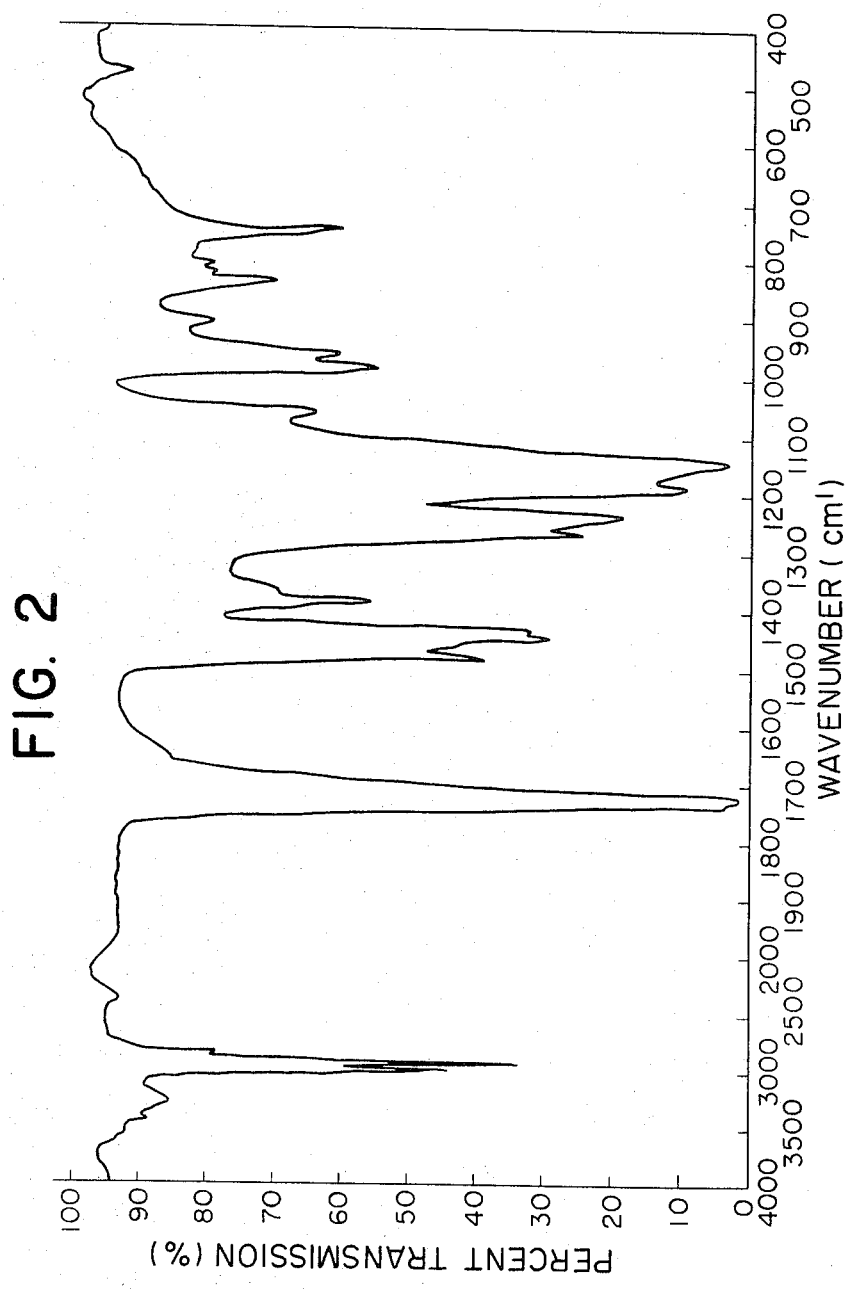
FIG. 2 and FIG. 4 show the infrared spectra of the polymerized portion of the respective graft polymers obtained in Example 1 and Example 2.

When a 10 g portion of the solid matter was subjected to extraction with benzene for 24 hours by means of a Soxhlet extractor, 0.30 g of benzene soluble portion was obtained. This benzene soluble portion was composed of homopolymer of methyl methacrylate. When the remaining benzene insoluble portion was subjected to 2 hours' decomposition with 10 percent hydrochloric acid at 70°C, the yield of hydrochloric acid insoluble portion was 15.8 wt percent. The infrared absorption spectrum of this hydrochloric acid insoluble portion agreed mainly with the spectrum of polymethyl methacrylate (cf. FIG. 2). These showings verify that the majority of the solid matter consists of crystals of calcium sulfite with a high molecular weight substance grafted thereon.

By subjecting a 10 g portion of the foregoing solid matter to 2 hours' immersion in a 10 percent solution of hydrochloric acid and filtration thereafter, followed by drying of the filter cake under a reduced pressure, 1.31 g of powder was obtained. When this powder was analyzed by means of infrared absorption spectrum, it was confirmed that said powder was composed mainly of polymethyl methacrylate. Further, examination of this powder by means of a microscope disclosed that said powder consisted of hollow, fine particles each having a cavity resulting from the dissolution of calcium sulfite.

The foregoing solid matter was molded into a 3mm thick plate by applying a temperature of 200°C and a pressure of 20 Kg/cm² for 20 minutes. The thus molded plate was treated with a 10 percent hydrochloric acid for 8 hours, washed in water, and then dried. The molded plate thus treated with hydrochloric acid retained its pre-treatment shape. Examination of the molded plate after treatment with hydrochloric acid by means of a microscope disclosed the presence of a multiplicity of pores, said pores having a pore size practically agreeing with the grain size of the starting material calcium sulfite.

Next, the foregoing solid matter was molded into another 3mm thick plate by applying a temperature of 250°C and a pressure of 20 Kg/cm² for 10 minutes. The thus molded plate was dipped in a 5 percent solution of acetic acid for 12 hours at room temperature, washed in water, and then dried. The result of examination of the molded plate thus treated with acetic acid by means of a microscope verified that it was a porous plate and the size of the pores practically agree with the grain size of calcium sulfite.

EXAMPLE 2.

Figure 3:
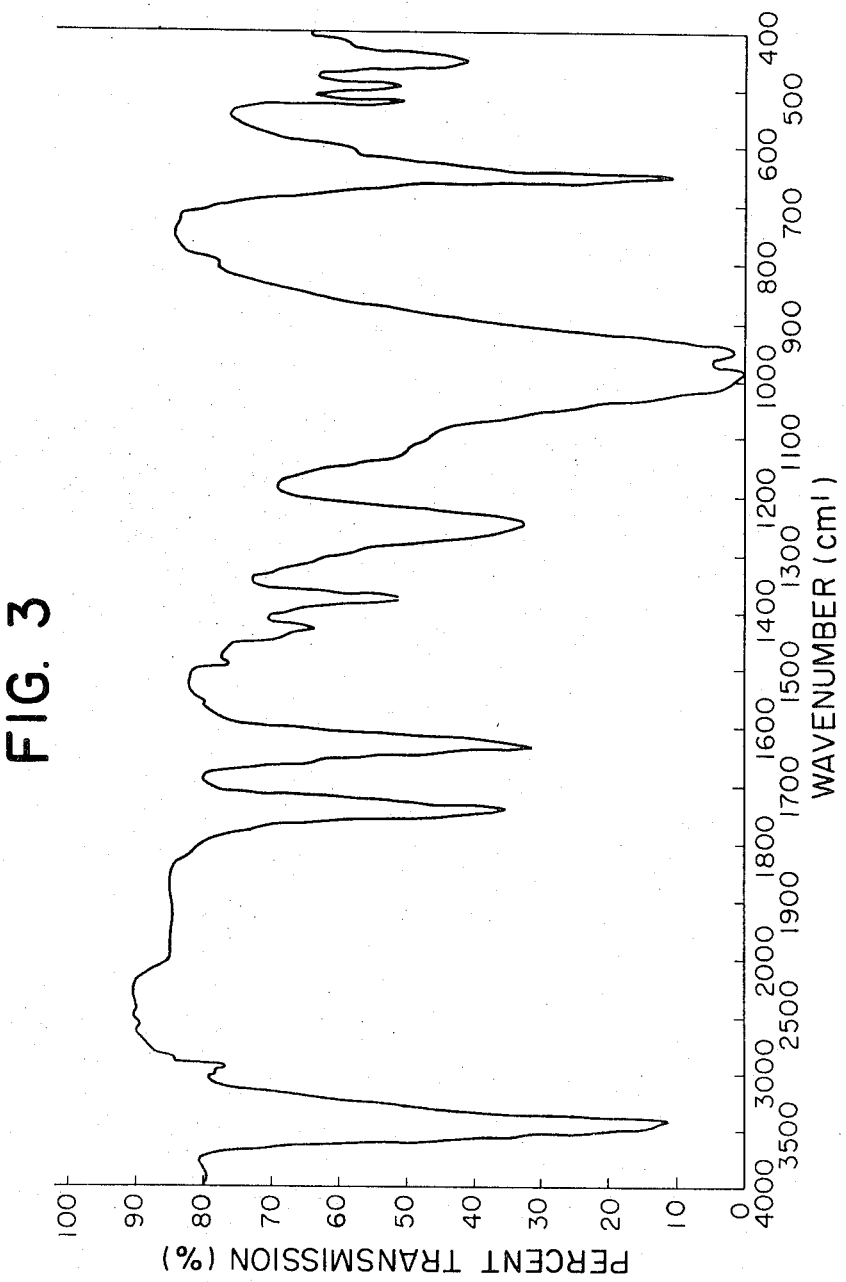

After suspending 20.4 g of calcium sulfite having a grain size of less than 100 mesh in 80.0 g of water at 50°C under atmospheric pressure, 20.6 g of vinyl acetate monomer was added to the suspension. Next, 1.9 g of sulphur dioxide was blown into this suspension with stirring over one hour period at said temperature. Then, after further stirring for 2 hours, the suspension was filtered and the residue was dried under a reduced pressure, whereby 24.1 g of solid matter was obtained. On this occasion, water-soluble calcium hydrogen sulfite was produced on a part of the starting calcium sulfite and the content of calcium sulfite in the residue decreased. When a portion of the thus obtained solid matter was analyzed by means of infrared absorption spectrum, the result showed that the solid matter was composed of calcium sulfite and mainly of polyvinyl acetate (cf. FIG. 3).

Figure 4:
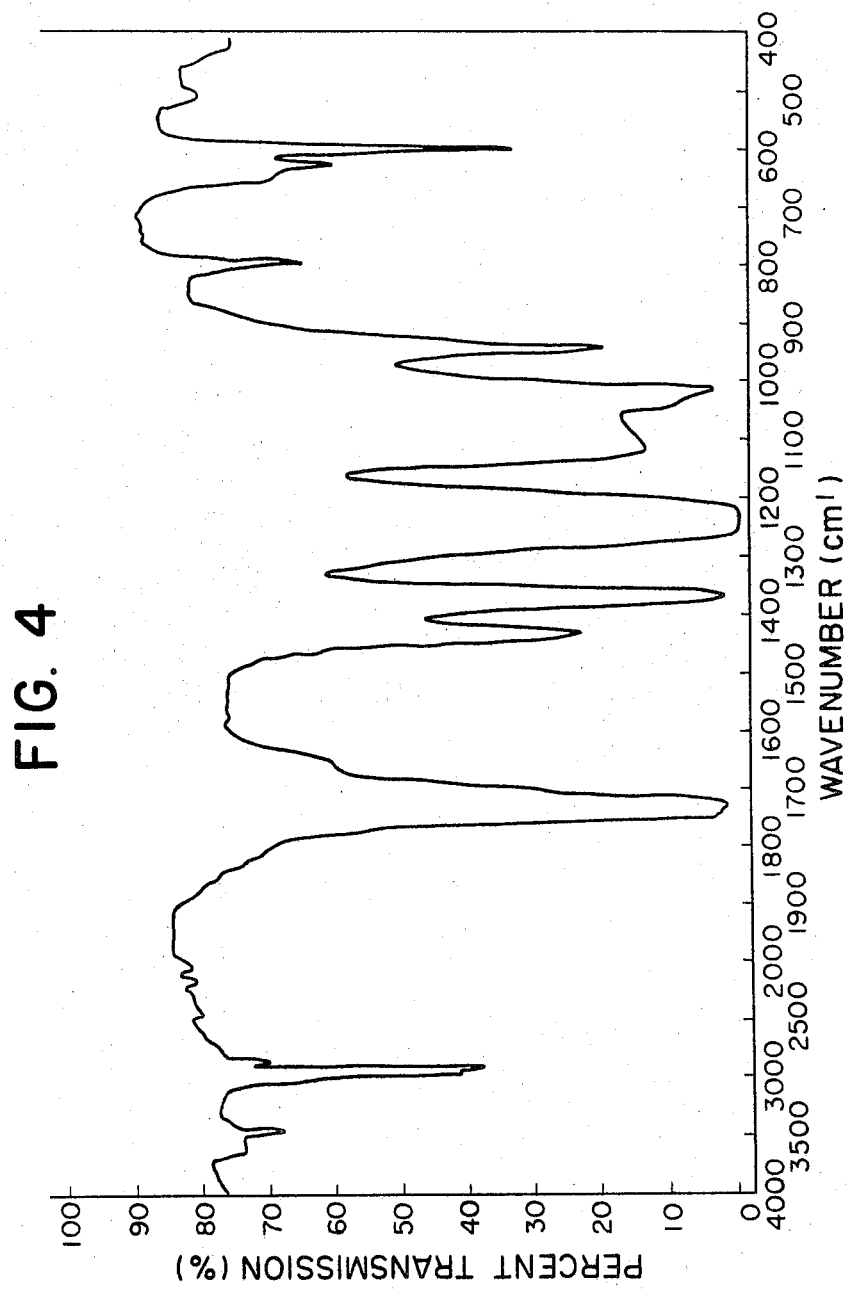

When a 10 g portion of this solid matter was subjected to extraction with methanol for 24 hours by means of a Soxhlet extractor, 17.0 wt percent of methanol soluble portion was obtained. This methanol soluble portion was composed mainly of polyvinyl acetate. When the remaining methanol insoluble portion was subjected to 2 hours' decomposition with 10 percent hydrochloric acid, the yield of hydrochloric acid insoluble portion was 2.0 percent. The infrared absorption spectrum of this hydrochloric acid insoluble portion agreed mainly with the spectrum of polyvinyl acetate (of. FIG. 4). These showings verify that a part of said solid matter consists of crystals of calcium sulfite with a high molecular substance grafted thereon.

EXAMPLE 3.

After suspending 20.4 g of calcium sulfite having a grain size of less than 100 mesh in 83.0 g of water at 50°C under atmospheric pressure, 22.4 g of styrene monomer was added to the suspension. Next, 1.2 g of sulfur dioxide was blown into this suspension with stirring over a one hour period at said temperature. Then, after further stirring for 2 hours, the suspension was filtered and the residue was dried under a reduced pressure, whereby solid matter was obtained. When a portion of the thus obtained solid matter was analyzed by means of infrared absorption spectrum, the result showed that said solid matter was composed substantially of calcium sulfite accompanied by a small amount of polystyrene.

When a 10 g portion of this solid matter was subjected to extraction with benzene for 24 hours by means of a Soxhlet extractor, 0.8 wt percent of benzene soluble portion was obtained. This benzene soluble portion was composed of polystyrene. When the remaining benzene insoluble portion was subjected to 2 hours' decomposition with 10 percent hydrochloric acid, the yield of hydrochloric acid insoluble portion was 0.3 wt percent. The infrared absorption spectrum of this hydrochloric acid insoluble portion agreed with the spectrum of polystyrene.

These showings verify that the solid portion consists of crystals of calcium sulfite with a high molecular substance grafted thereon.

EXAMPLE 4

After suspending 20.2 g of calcium sulfite having a grain size of less than 100 mesh in 80.0 g of water at 50°C under the atmospheric pressure, 27.0 g of methyl acrylate monomer was added to the suspension. Next, 3.4 g of sulfur dioxide was blown into this suspension with stirring over a one hour period at said temperature. Then, after further stirring for 2 hours, the suspension was filtered and the residue was dried under a reduced pressure, whereby 39.5 g of solid matter was obtained. On this occasion, water-soluble calcium hydrogen sulfite was produced on a part of the starting calcium sulfite and the content of calcium sulfite in the residue decreased. When a portion of the resulting solid matter was analyzed by means of infrared absorption spectrum, the result showed that the solid matter was composed of calcium sulfite and mainly of polymethyl acrylate.

When a 10 g portion of this solid matter was subjected to extraction with benzene for 24 hours by means of a Soxhlet extractor, 25.6 wt percent of benzene soluble portion was obtained. This benzene soluble portion was composed mainly of polymethyl acrylate. When the remaining benzene insoluble portion was subjected to 2 hours' decomposition with 10 percent hydrochloric acid, the yield of hydrochloric acid insoluble portion was 31.5 wt percent.

These showings verify that the majority of said solid matter consists of crystals of calcium sulfite with a high molecular substance grafted thereon.

EXAMPLE 5

After suspending 20.0 g of calcium carbonate having a grain size of less than 100 mesh in 80.0 g of water at 50°C under atmospheric pressure, 22.8 g of methyl methacrylate monomer was added to the suspension. Next, 6.0 g of carbon dioxide was blown into this suspension with stirring over 3 hours' period at said temperature. Then, after further stirring for 3 hours, the suspension was filtered and the residue was dried under a reduced pressure, whereby 19.8 g of solid matter was obtained. The decrease of calcium carbonate in the residue as compared with the starting calcium carbonate is attributable to the generation of calcium bicarbonate which is soluble in water. When a portion of the thus obtained solid matter was analyzed by means of infrared absorption spectrum, the result showed that said solid matter was composed mainly of calcium carbonate accompanied by some organic substances.

When a 10 g portion of this solid matter was subjected to extraction with benzene for 24 hours by means of a soxhlet extractor, 1.2 wt percent of benzene soluble portion was obtained. This benzene soluble portion was composed of polymethyl methacrylate. When the remaining benzene insoluble portion was subjected to 2 hours' decomposition with 10 percent hydrochloric acid, the yield of hydrochloric acid insoluble portion was 0.2 wt percent. The infrared absorption spectrum of this hydrochloric acid insoluble portion agreed mainly with the spectrum of polymethyl methacrylate.

These showings verify that the solid portion consists of crystals of calcium carbonate with a high molecular substance grafted thereon.

EXAMPLE 6

After suspending 20.3 g of calcium carbonate having a grain size of less than 100 mesh in 80.0 g of water at 50°C under atmospheric pressure, 22.3 g of methyl methacrylate monomer was added to the suspension. Next, 6.0 g of sulfur dioxide was blown into this suspension with stirring over a one hour period at said temperature. Then, after further stirring for 5 hours and a half, the suspension was filtered and the residue was dried under a reduced pressure, whereby 21.9 g of solid matter was obtained. The decrease of inorganic matters in the residue on this occasion is attributable to the generation of calcium bicarbonate and calcium bisulfite by virtue of sulfur dioxide blown in as above and the decrease of calcium salt in the residue because of these products being soluble in water. When a portion of the thus obtained solid matter was analyzed by means of infrared absorption spectrum, the result showed that said solid matter was composed mainly of calcium carbonate and calcium sulfite along with some organic substances.

When a 10 g portion of this solid matter was subjected to extraction with benzene for 24 hours by means of a Soxhlet extractor, 3.2 wt percent of benzene soluble portion was obtained. This benzene soluble portion was composed mainly of polymethyl methacrylate. When the remaining benzene insoluble portion was subjected to 2 hours' decomposition with 10 percent hydrochloric acid, the yield of hydrochloric acid insoluble portion was 3.8 wt percent. The infrared absorption spectrum of this hydrochloric acid insoluble portion agreed mainly with the spectrum of polymethyl methacrylate.

These showings verify that the majority of said solid matter consists of a crystalline substance with a high molecular substance grafted thereon.

EXAMPLE 7.

After suspending 20.2 g of calcium sulfite having a grain size of less than 100 mesh in 79.5 g of water at 50°C under the atmospheric pressure, 20.8 g of styrene and 2.7 g of methyl methacrylate monomer were added to the suspension. Next, 2.8 g of sulfur dioxide was blown into this suspension with stirring over a 1 hour period at said temperature. Then, after further stirring for 2 hours, the suspension was filtered and the residue was dried under a reduced pressure, whereby 19.8 g of solid matter was obtained. On this occasion, water-soluble calcium bisulfite was produced on a part of the starting calcium sulfite and the content of calcium sulfite in the residue decreased. When a portion of the thus obtained solid matter was analyzed by means of infrared absorption spectrum, the result showed the presence of an organic substance contained in an inorganic substance. When a 10 g portion of this solid matter was subjected to hours' benzene extraction, 2.7 wt percent of extract obtained. When the extraction residue was subjected to 2 hours' decomposition with 10 percent hydrochloric acid, the yield of hydrochloric acid insoluble portion was 3.2 wt percent. The infrared absorption spectrum of this hydrochloric acid insoluble portion agreed with the spectrum of styrene~methyl methacrylate copolymer.

These showings verify that the majority of said solid matter consists of crystals of calcium sulfite with a high molecular substance grafted thereon.

EXAMPLE 8.

After suspending 400 g of calcium sulfite having a grain size of less than 100 mesh in 138 g of water at 50°C under atmospheric pressure, 100 g of methacrylic acid monomer was added to the suspension. Next, 180 g of 2.31 N aqueous sulfurous acid was added to this suspension with stirring at said temperature. Then, after further stirring for 4 hours, the suspension was filtered and the residue was dried under a reduced pressure, whereby 445 g of solid matter was obtained. When a portion of the thus obtained solid matter was analyzed by means of infrared absorption spectrum, and the result showed the presence of an organic substance contained in an inorganic substance. When a 10 g portion of this solid matter was subjected to 24 hours' benzene extraction, 0.1 g of extract was obtained. When the extraction residue was subjected to 2 hours' decomposition with 10 percent hydrochloric acid, the yield of hydrochloric acid insoluble portion was 15.0 wt percent. The infrared absorption spectrum of this hydrochloric acid insoluble portion agreed mainly with the absorption of polymethyl methacrylate. These showings verify that the majority of said solid matter consists of crystals of calcium sulfite with a high molecular substance grafted thereon.

Next, when the molded products obtained by subjecting the foregoing solid matter to pressure molding were tested by means of a construction material inflammability tester manufactured in accordance with Notification No. 3415 of the Ministry of Construction (Japan), they came up to the standard of noninflammable material in all performances with respect to the degree of fuming, the temperature of exhaust, the surviving flame after finishing the heating, the harmful deformation of the test piece such as melting, cracking, etc.

EXAMPLE 9

After suspending 20.0 g of calcium sulfite having a grain size of less than 100 mesh in 81.3 g of water at 50°C under atmospheric pressure, 2.8 g of sulfur dioxide was blown into the suspension with stirring over 50 minutes' period. Next, after adding 20.7 g of methyl methacrylate monomer to this suspension and 3 hours' stirring subsequent thereto, the suspension was filtered and the residue was dried under a reduced pressure, whereby 25.5 g of solid matter was obtained. When a portion of the thus obtained solid matter was analyzed by means of infrared absorption spectrum, the result showed that said solid matter was composed of calcium sulfite and polymethyl methacrylate. When a 10 g portion of this solid matter was subjected to 24 hours' benzene extraction, the yield of extract was 8.0 wt percent. And, when the extraction residue was subjected to 2 hours' decomposition with 10 percent hydrochloric acid, the yield of hydrochloric acid insoluble portion was 10.9 wt percent. The infrared absorption spectrum of this hydrochloric acid insoluble portion agreed with the spectrum of polymethyl methacrylate.

The embodiments of the invention in which an exclusive property or privilege is claimed are defined as follows:

1. A method of preparing a polymer graft-polymerized onto a crystalline inorganic salt, which comprises the steps of :
    mixing (a) an aqueous suspension of particles of crystalline inorganic salt selected from the group consisting of calcium sulfite and calcium carbonate, (b) a substance selected from the group consisting of sulfur dioxide and carbon dioxide and capable of reacting with said crystalline inorganic salt to form active radical sites on said salt, and (c) at least one monomer capable of radical polymerization and having an e value of from −0.8 to +0.8, to form a reaction mixture of (a), (b) and (c);
    maintaining said mixture under polymerizing conditions effective to polymerize said monomer (c) onto the active sites on said salt to form solid particles of a polymer of (c) grafted onto a nucleus of said crystalline inorganic salt, and then recovering the polymerization product particles from the reaction system.

2. A method according to claim 1, wherein said polymerizable monomer is selected from the group consisting of styrene, vinyl isocyanate, 1-pentene, vinyl stearate, 2-vinylpyridine, m-chlorostyrene, n-octyl methacrylate, vinyl acetate, sodium acrylate, chloroprene, vinyl laurate, vinyl chloride, vinylidene chloride, methyl methacrylate, pentachlorostyrene, methyl acrylate, methyl vinyl ketone, methacrylic acid, acrylic acid and mixtures thereof.

3. A method according to claim 1 wherein said compound is sulfur dioxide and said crystalline inorganic salt is calcium sulfite.

4. A method according to claim 1, wherein said compound is carbon dioxide and said crystalline inorganic salt is calcium carbonate.

5. A method according to claim 1, wherein said substance is sulfur dioxide and said crystalline inorganic salt is calcium carbonate.

6. A method according to claim 1, wherein and said substance is supplied by blowing a gas thereof or adding an aqueous solution thereof into the aqueous suspension of said crystalline inorganic salt and said monomer.

7. A method according to claim 1, wherein said substance is sulfur dioxide, said inorganic salt is calcium sulfite and said monomer is methyl methacrylate.

8. A method according to claim 1, in which said polymerizing conditions comprise a polymerization temperature of 10° to 60°C.

9. A method according to claim 1, including the additional step of treating said polymerization product particles with a solution of an acid selected from the group consisting of hydrochloric acid, nitric acid and acetic acid to leach out said inorganic salt whereby to transform said particles to porous or hollow form.

* * * * *

UNITED STATES PATENT OFFICE
CERTIFICATE OF CORRECTION

Patent No. 3,857,816          Dated December 31, 1974

Inventor(s) Tadashi Yamaguchi, Hiroshi Hoshi, Michio Hirakawa and Isao Watanabe

It is certified that error appears in the above-identified patent and that said Letters Patent are hereby corrected as shown below:

On the title page, add the following section:

---Assignee: Lion Fat & Oil Co., Ltd., Tokyo, Japan---.

Col. 9, lines 10 and 11; change "compound" to ---substance---.

Col. 9, lines 13 and 14; change "compound" to ---substance---.

Col. 10, line 1; delete "and".

Signed and sealed this 29th day of April 1975.

(SEAL)
Attest:

RUTH C. MASON
Attesting Officer

C. MARSHALL DANN
Commissioner of Patents
and Trademarks